United States Patent
Gehrmann et al.

(10) Patent No.: US 7,386,726 B2
(45) Date of Patent: Jun. 10, 2008

(54) PERSONAL CERTIFICATION AUTHORITY DEVICE

(75) Inventors: Christian Gehrmann, Lund (SE);
Bernard Smeets, Dalby (SE); Jacobus Haartsen, Hardenberg (NL); Joakim Persson, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 823 days.

(21) Appl. No.: 10/161,567

(22) Filed: May 31, 2002

(65) Prior Publication Data
US 2003/0088772 A1 May 8, 2003

Related U.S. Application Data

(60) Provisional application No. 60/350,132, filed on Nov. 2, 2001.

(51) Int. Cl.
*H04L 9/00* (2006.01)

(52) U.S. Cl. .............. 713/175; 713/155; 713/156; 726/10

(58) Field of Classification Search ........... 713/175, 713/155; 380/277–285
See application file for complete search history.

(56) References Cited

U.S. PATENT DOCUMENTS

| | | | |
|---|---|---|---|
| 5,781,723 A | 7/1998 | Yee et al. | 395/186 |
| 5,835,595 A * | 11/1998 | Fraser et al. | 713/169 |
| 5,898,831 A | 4/1999 | Hall et al. | 395/187.01 |
| 5,909,183 A | 6/1999 | Borgstahl et al. | 340/825.22 |
| 5,917,913 A | 6/1999 | Wang | 380/25 |
| 5,940,506 A | 8/1999 | Chang et al. | 380/4 |
| 5,949,777 A | 9/1999 | Uyesugi et al. | 370/345 |
| 5,953,425 A | 9/1999 | Selker | 380/25 |
| 6,069,896 A | 5/2000 | Borgstahl et al. | 370/401 |
| 6,092,192 A | 7/2000 | Kanevsky et al. | 713/186 |
| 6,175,922 B1 | 1/2001 | Wang | 713/182 |
| 6,198,996 B1 | 3/2001 | Berstis | 701/36 |
| 6,212,634 B1 | 4/2001 | Geer, Jr. et al. | 713/156 |
| 6,217,351 B1 | 4/2001 | Fung et al. | 439/131 |
| 6,275,500 B1 | 8/2001 | Callaway, Jr. et al. | 370/449 |
| 6,282,183 B1 | 8/2001 | Harris et al. | 370/338 |
| 6,314,091 B1 | 11/2001 | LaRowe, Jr. et al. | 370/338 |
| 6,754,661 B1 * | 6/2004 | Hallin et al. | 707/100 |
| 6,826,690 B1 * | 11/2004 | Hind et al. | 713/186 |
| 7,068,789 B2 * | 6/2006 | Huitema et al. | 380/277 |
| 2001/0016909 A1 * | 8/2001 | Gehrmann | 713/171 |
| 2002/0012133 A1 * | 1/2002 | Haruna et al. | 358/1.15 |
| 2002/0026584 A1 * | 2/2002 | Skubic et al. | 713/180 |
| 2002/0114470 A1 * | 8/2002 | Mauro et al. | 380/270 |
| 2002/0161999 A1 * | 10/2002 | Gunter et al. | 713/168 |
| 2004/0096063 A1 * | 5/2004 | Carroni et al. | 380/279 |
| 2005/0191990 A1 * | 9/2005 | Willey et al. | 455/411 |

* cited by examiner

*Primary Examiner*—Nasser Moazzami
*Assistant Examiner*—Fikremariam Yalew
(74) *Attorney, Agent, or Firm*—Michael Cameron

(57) ABSTRACT

A method for public key certification in a local network environment, wherein a personal certification authority associated with the local network environment is connected with a first device needing to be certified. Responsive to the connection, a certificate is provided to the device to be certified from the personal certification authority. The devices receiving a certificate may then use the certificate to carry out secure information exchange within the local network environment with other devices having a similar certificate.

36 Claims, 2 Drawing Sheets

PERSONAL CERTIFICATION AUTHORITY DEVICE

RELATED APPLICATION(S)

This application claims priority from and incorporates herein by reference the entire disclosures of U.S. Provisional Application Ser. No. 60/350,132 filed Nov. 2, 2001.

TECHNICAL FIELD

The present invention relates to public/private key certification, and more particularly, to the use of personal certification authorities within a personal network.

BACKGROUND OF THE INVENTION

Bluetooth 1.1 cryptographic services are currently provided on the baseband level. Key exchanges, authentications and encryptions are defined to be carried out in a low rate mode. There is currently in development a high rate mode for use in Bluetooth which will provide significantly different connection protocols and cryptographic services than are available in Bluetooth 1.1. From a communications point of view, the main difference between the existing low rate Bluetooth mode and the new Bluetooth high rate mode is that in high rate mode, any participating device may set up a communications link with any other device. Thus, the typical master/slave piconet utilized within low rate Bluetooth is not used within high rate mode Bluetooth. Thus, there is a need to quickly set up a secure communications link between any two devices.

Current security concepts require that secret keys be exchanged between two devices before security mechanisms may be applied to connections between devices communicating in a low rate mode. This is a rather cumbersome procedure that requires users to provide information such as a pin number. In a high rate mode, it would be necessary to find alternative ways of setting up a secure communication between devices. Additionally, current devices operating in a low rate mode would further benefit from alternative solutions that minimize the amount of user interactions required to initialize a secure link.

One potential solution involves the use of digital certificates by connecting devices in order to establish proper authentication for a link. Normally, a certification authority issues a public key certificate such as X.509. The certification authority is responsible for determining that the public key in an issued certificate corresponds to a private key of a holder with whom the certificate is being issued. This is necessary in order to maintain the security of a global or a large public key infrastructure The drawback with this type of system is that a central certification authority must issue all necessary certificates used by the communication units and all units must share trusted public root keys This is a tedious process that the user of a personal communication unit would like to avoid. Furthermore, it is very costly to maintain a well-controlled highly secure certification process that can handle thousands of users On the other hand, users desiring to operate on their own local environment, such as a personal area network (PAN) have no benefits inside their PAN from having a centralized certification authority like VeriSign. The user may not wish to delegate the certification authority operation to a centralized entity outside of their personal environment for privacy reasons. Thus, there is a need for providing individuals in personal local networks an option outside of the use of a centralized certification authority such as VeriSign.

SUMMARY OF THE INVENTION

The present invention overcomes the foregoing and other problems with a system and method using a personal certification authority device associated with a local network environment. A device needing to be certified may be connected to the personal certification authority device, and in response to the connection, a certificate is issued to the device needing to be certified. Using the certificate, the device may establish secure information exchange within the local network environment with either the personal certification authority device or other certified devices including a similar certificate. Hence, a certification procedure between the personal certification authority and each device is enough to create secure connections between any two certified device within the local network environment

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
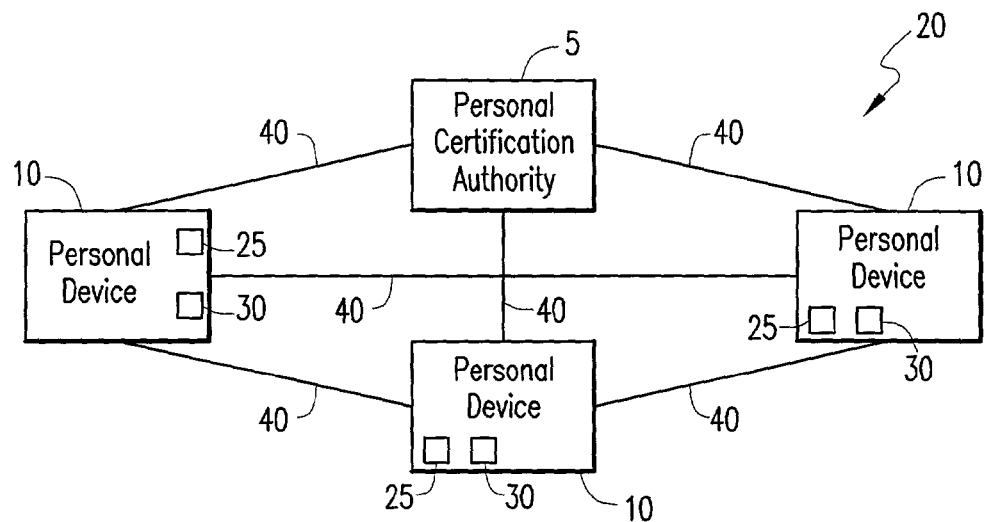
FIG. 1 illustrates a number of personal communication devices associated in a personal network.

Referring now to the drawings, and more particularly to FIG. 1, wherein there is illustrated a number of personal communication devices communicating with each other using, for example, the Bluetooth Wireless Technology. While the present description is made with respect to the use of the Bluetooth Wireless Technology, it should be realized by those skilled in the art that the present invention is applicable to any wireless or wireline communication system or protocol used for communicating among a number of personal communication devices 10. The system is applicable to personal communication devices using high rate Bluetooth. High rate Bluetooth operates at a bit speed of up to approximately 12 Mb/s The personal communication devices 10 include a personal certification authority device 5. A personal certification authority enables a user within a home or small office environment to utilize a public key infrastructure within a local, smaller personal network 20, such as a personal area network. Each unit within the personal network 20 shares a common root public key 25 in addition to a unique private key 30 associated with each personal communication device 10.

The personal certification authority device 5 issues certificates. A certificate certifies the public key of the private-public key pair and the identify of a device 10. The certificate is signed by the personal certification authority device 5. The public root key of the personal certification authority device 5 is used to verify a personal certification authority device 5 signature for any certificate issued by the personal certification authority device 5. All personal devices 10 share the same public root key All personal devices 10 are able to verify a certificate issued by the personal certification authority device 5 and consequently the public keys and identities of the other devices 10 in the local network Hence, by exchanging certificates secure communication can be established between any two devices in the local personal network.

A public/private key communication infrastructure enables a transmitting device to encode a message using a private key. A receiving device decodes the message using a known public key in order to reconstitute the received message. Information enabling decryption and encryption using the public and private keys is provided via the certificate issued by the personal certification authority device 15. The public and private keys are mathematically linked to one another enabling a message to be encrypted with the private key and decrypted with the public key. The public key is made available to all users and the private key is kept confidential by the individual to whom it is associated.

Figure 2:
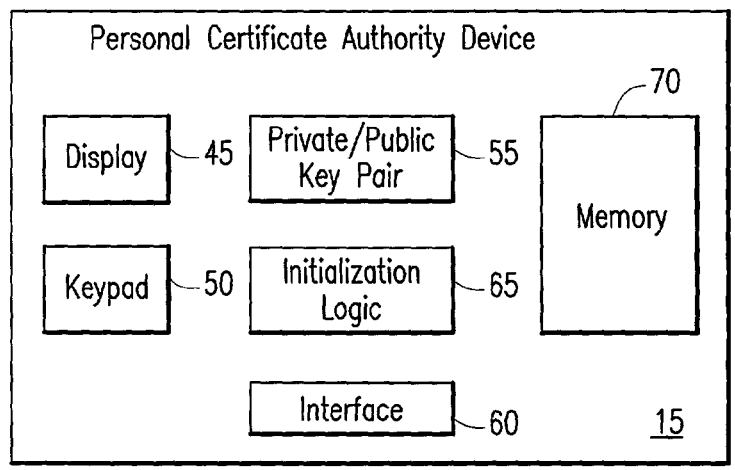
FIG. 2 is a block diagram of a personal certification authority device.

Referring now to FIG. 2, there is illustrated the personal certification authority device 15 described in FIG. 1. The personal certification authority device 15 may be any personal communication device, including, but limited to a mobile phone, personal digital assistant, PC, pager, etc. The personal certification authority device 15 includes a display 45 for displaying relevant information to a user and a keypad 50 for enabling a user to interface with the personal certification authority device 15. The personal certification authority device 15 further includes a private/public keypair 55 enabling encryption and decryption of communications. The private/public keypair 55 may be preconfigured at the manufacturer, or alternatively, the personal certification authority 15 may have the ability to generate a private/public keypair internally. A wireless interface 60 enables the personal certification authority device 15 to interact with other personal devices 10 (FIG. 1) in order to provide certificates thereto as will be more fully described in a moment. The wireless interface 60 preferably implements a Bluetooth connection according to the Bluetooth Wireless Technology. It should be realized that other than a wireless interface 60, a wireline interface may be implemented according to the system and method of the present invention Initialization logic 65 controls a process wherein the personal certification authority device 15 connects with a corresponding personal device 10 and provides a certificate to that device, after authentication of the personal device 10, enabling secure communication from the personal device 10 to the personal certification authority device 15 or any other personal device 10 also having a provided certificate from the personal certification authority device 15. In the initialization phase, the user of the personal certification authority device 15 confirms the initialization of a new personal device 10. This can be done by a special key on the keypad 50 of the personal certification authority device 15. A memory 70 stores information relating to certificates and/or the ID's of personal communication device 10 for which the personal certification authority device 15 has issued a certificate.

Figure 3:
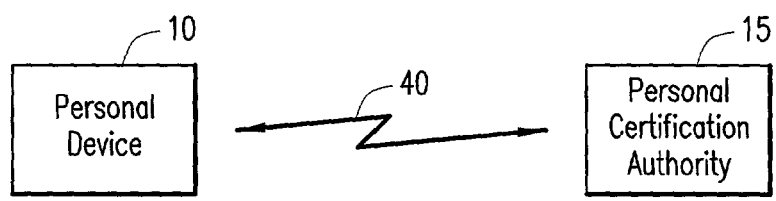
FIG. 3 illustrates a communication between a personal certification authority and a device being certified.
Figure 4:
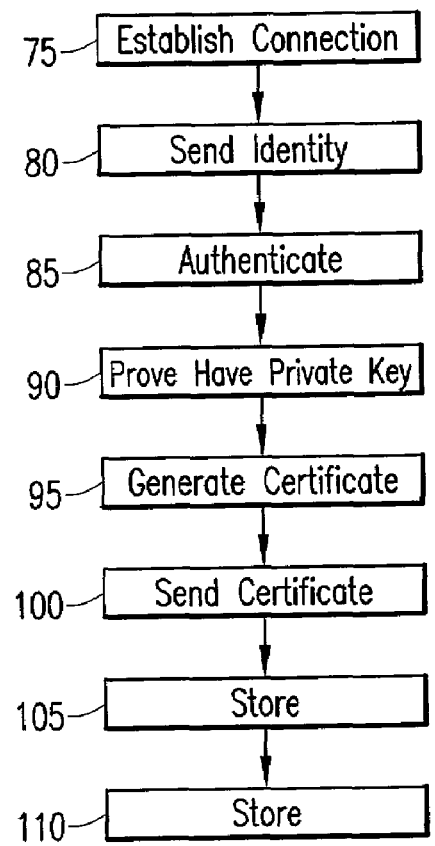
FIG. 4 is a flow diagram illustrating an initialization process performed between a personal certification authority device and a device to be certified.

Referring now to FIGS. 3 and 4, there is illustrated a situation wherein a personal certification authority device 15 establishing a connection with and initializes a personal device 10 via a wireless communications link 40. After the personal device 10 has established a connection 40 with the personal certification authority device 15 at step 75, the personal device 10 transmits at step 80 its identity together with a public key to the personal certification authority 15, and the personal certificate authority device 15 sends its public key (certificate authority root key) to the personal device 15. After this has been done, the connection 40 between the personal device 10 and the personal certification authority device 15 may be authenticated at step 85. However, this step is not required. As part of the authentication, a user of the personal device 10 may be asked to enter one or more pass key values into the personal device 10 or the personal certification authority device 15. The values entered will be displayed by either or both of the personal device 10 and personal certification authority 15.

Figure 5:
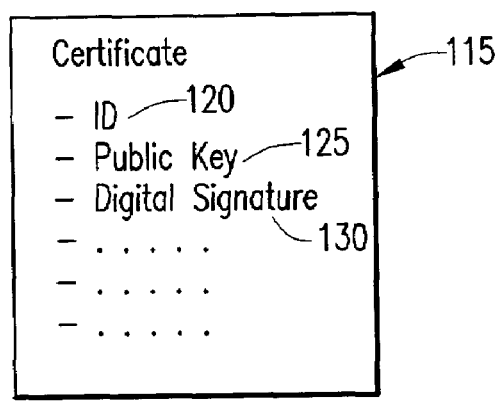
FIG. 5 illustrates a certificate provided by a personal certification authority according to the present invention.

The personal certification authority requests at step 90 that the personal device 10 prove that the personal device 10 possesses a private key corresponding to the public key sent to the personal certification authority device 15 at step 80. This may be done, for example, using a challenge response scheme. Additionally, the personal device 15 at step 90 might request the personal CA device 10 to prove that the personal CA device 10 possesses a private key corresponding to the private key sent to the personal device 10 at step 80 Once the personal device 10 has proved that it possesses the private key corresponding to the public key, the personal certification authority device 15 generates a certificate for device 10 at step 95. The certificate certifies the public key and the identity of the device 10. Referring now also to FIG. 5, the certificate 115 contains among other information, the identity 120 of the personal device 10, the public key 125 of the personal device 10 and a digital signature 130 of the personal certification authority device 15. This list of information is intended to be exemplary and other information may be included within the certificate 115. It should be understood that any certificate format known in the art, such as X.509, may be used.

The certificate 115 is forwarded to the personal device 10 at step 100 along with the public root key of the personal certification authority 15 The personal device 10 stores at step 105 the new certificate as well as the new personal certification authority public root key within a memory in the personal device 10. Preferably, the certificate and the public root key are stored in a tamper resistant memory or other secure storing means. The personal certification authority device 15 stores at step 110 the certificate or an ID of the personal device 10 in a memory 70 containing all the certificates or ID's for which the personal certification authority 15 has issued a certificate 115.

After the initialization has been completed, the personal device 10 possesses a certificate 115 that it can present to all other personal devices 10 attempting to generate a connection 40 with the personal device 10. The keys in the certificate 15 can be used to authenticate personal device 10, exchange session keys, sign information or encrypt information. This method makes it possible to create end to end secure relationships between two personal devices 10. In particular, bonding with other personal devices 10 that have been certified by the personal certification authority device 15 can easily be automated without user interaction The only requirement is that all personal devices 10 are initialized with the same personal certification authority device 15. This is useful for secure or peer to peer communications and small personal networks like Bluetooth, Bluetooth high rate (HR), or IEEE 802.11 networks.

The previous description is of a preferred embodiment for implementing the invention, and the scope of the invention should not necessarily be limited by this description. The scope of the present invention is instead defined by the following claims

We claim:

1. A method for public key certification in a local network environment adapted to network a plurality of devices, comprising the steps of:
   establishing a public key infrastructure (PKI) in any one of a plurality of devices, said any device being deemed a personal certification authority device, the personal certification authority device adapted to internally generate a private/public keypair at the moment the device becomes the personal certification authority device;
   connecting the personal certification authority device associated only with the local network environment with any other of the plurality of devices, such devices being a first device to be certified; and
   providing a certificate to the first device to be certified from the personal certification device upon request from such first device said certificate enabling secure connection establishment with the local network environment, wherein each of the plurality of devices adapted to be included in the local network environment are capable of internally generating and providing to other devices within such local network environment, certificates to said other devices upon request and wherein the providing step further comprises receiving an identifier of the first device to be certified and a public key at the personal certification authority device;
   confirming the first device to be certified has a private key corresponding to the received public key; and
   issuing the certificate from the personal certification authority device associated only with the local network environment to the first device to be certified.

2. The method of claim 1, further including the steps of:
   connecting at least, one other device to be certified with the personal certification authority device associated with the local network environment; and
   providing a second certificate to the at least one other device to be certified by the personal certification authority device associated with the local network environment, upon request from such second device said second certificate enabling secure connection establishment with the local network environment.

3. The method of claim 1, wherein the local network environment comprises a personal area network.

4. The method of claim 1, further including the steps of:
   receiving a second public key from the personal certification authority device at the first device; and
   confirming the personal certification authority device has a second private key corresponding to the received second public key.

5. The method of claim 1, further including the step of storing data associated with the first device to be certified responsive to providing the certificate.

6. The method of claim 1, further including the step of storing a user ID of the first device.

7. The method of claim 1, further including the step of storing the certificate provided to the first device.

8. The method of claim 1 further including the step of authenticating the connection between the first device and the personal certification authority device.

9. The method of claim 1, further including the step of storing the certificate at the first device.

10. The method of claim 1, wherein the certificate further includes at least one of the public key, the identifier of the first device, a digital signature of the personal certification authority device, and a public root key of the personal certification authority device.

11. A method for public key certification in a personal network environment adapted to network a plurality of devices, comprising the steps of:
    establishing a public key infrastructure (PKI) in any one of a plurality of devices, said any device being deemed a personal certification authority device, the personal certification authority device adapted to internally generate a private/public keypair at the moment the device becomes the personal certification authority device;
    connecting the personal certification authority device associated only with the personal network with any other of the plurality of devices, such device being a first device to be certified;
    receiving an identifier of the first device to be certified and a public key at the personal certification authority device;
    confirming the first device to be certified has a private key corresponding to the received public key;
    receiving a second public key from the personal certification authority device at the first device;
    confirming the personal certification authority device has a second private key corresponding to the received second public key;
    issuing a certificate from the personal certification authority device associated only with the personal network to the first device to be certified, upon request from such first device, said certificate enabling secure connection establishment with the personal network; and
    storing data associated with the first device to be certified responsive to providing the certificate at the personal certification authority device, wherein each of the plurality of devices adapted to be included in the local network environment are capable of internally generating and providing to other devices within the local network environment, certificates to said other devices upon request.

12. The method of claim 11, further including the steps of:
    connecting at least one other device to be certified with the personal certification authority device associated with the local network environment; and
    providing a second certificate to the at least one other device to be certified with the personal certification device associated with the local network environment, upon request from such other device said second certificate enabling secure connection establishment with the personal network.

13. The method of claim 11, further comprising the step of connecting a personal certification authority device associated only with a personal area network.

14. The method of claim 11, further comprising storing a user ID of the first device associated with the first device to be certified responsive to providing the certificate at the personal certification authority device.

15. The method of claim 11, further comprising storing the certificate provided to the first device.

16. The method of claim 11, further including the step of mutually authenticating the connection between the first device and the personal certification authority.

17. The method of claim 11, further including the step of storing the certificate at the first device.

18. The method of claim 11, further including the step of storing a certificate authority root key at the first device.

19. The method of claim 11, wherein the certificate further includes at least one of the public key, the identifier of the first device, a digital signature of the personal certification authority device, and a public root key of the personal certification authority device.

20. A personal communications device having a public key infrastructure (PKI) for performing as a personal certification device for a first device, comprising:
- a means within the personal communications device adapted to internally generate a private/public keypair;
- an interface for establishing a local connection in a personal network environment adapted to network a plurality of devices, with the first device to be certified;
- control logic adapted to connect the personal communications device with a first device to be certified and provide a certificate to the first device to be certified upon request of such first device, to enable secure data exchange within a personal network, wherein the control logic is further adapted to:
- receive an identifier of the first device to be certified and a public key at the personal communications device;
- confirm the first device to be certified has a private key corresponding to the received public key; and
- issue the certificate and a certificate authority root key to the first device to be certified; and
- a memory for storing data relating to the certificate provided to the first device to be certified.

21. The device of claim 20, in combination with a personal network, wherein the personal network comprises a personal area network.

22. The device of claim 20, wherein the data comprises a user ID of the first device.

23. The device of claim 20, wherein the data comprises the certificate provided to the first device.

24. The device of claim 20, wherein the control logic is further adapted to mutually authenticate the connection between the first device and the personal certification device.

25. The device of claim 20, wherein the certificate further includes at least one of the public key, the identifier of the first device, a digital signature of the personal certification device, and a public root key of the personal certification device.

26. A personal network, comprising:
- a plurality of personal communications devices, and
- a personal certification authority device being any one of the plurality of personal communications devices, said personal certification authority having a public key infrastructure (PKI) which internally generates a private/public keypair and issue, upon request, a certificate to a first personal communications device being any one of the other of the plurality of personal communications devices said certificate enabling the first personal communications device and any other personal communication device having a certificate to perform secure information exchanges locally in the personal network, wherein each of the plurality of personal communications devices adapted to be included in the personal network are capable of internally generating and providing to other personal communication devices within such personal environment, certificates to said other personal communication devices upon request, wherein the personal certification authority device further receives an identifier of the first personal communication device and a public key at the personal certification authority device; confirms the first personal communications device has a private key corresponding to the received public key; and issues the certificate from the personal certification authority device to the first personal communications device.

27. The personal network of claim 26, wherein the personal certification authority device stores data associated with the first personal communications device responsive to issuing the certificate.

28. The personal network of claim 27, wherein the data comprises a user ID of the first personal communications device.

29. The personal network of claim 27, wherein the data comprises the certificate provided to the first personal communications device.

30. The personal network of claim 26, wherein the personal certification authority device authenticates the connection between the first personal communications device and the personal certification authority device.

31. The personal network of claim 26, wherein the first personal communications device stores the certificate at the first personal communications device.

32. The personal network of claim 26, wherein the certificate further includes at least one of the public key, the identifier of the first device, a digital signature of the personal certification device, and a public root key of the personal certification device.

33. The personal network of claim 26, wherein the personal network comprises a personal area network.

34. The personal network of claim 26, wherein the personal network comprises a Bluetooth network.

35. The personal network of claim 26, wherein the personal network comprises a Bluetooth high rate network.

36. The personal network of claim 26, wherein the personal network comprises an IEEE 802.11 network.

* * * * *